US007979540B2

(12) United States Patent  
Berry et al.

(10) Patent No.: US 7,979,540 B2
(45) Date of Patent: Jul. 12, 2011

(54) CONFIGURABLE RECOVERY OF ABORTED SESSION DATA

(75) Inventors: Charles Franklin Berry, Apalachin, NY (US); Nitin Jhingan, Vestal, NY (US); Glenn C. Godoy, Endwell, NY (US); Amy Jeanne Snavely, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 12/334,958

(22) Filed: Dec. 15, 2008

(65) Prior Publication Data

US 2010/0153779 A1    Jun. 17, 2010

(51) Int. Cl.
*G06F 13/00* (2006.01)
(52) U.S. Cl. .................. 709/224; 709/227; 718/101
(58) Field of Classification Search .............. 709/223, 709/224, 227; 718/100, 101
See application file for complete search history.

(56) References Cited

U.S. PATENT DOCUMENTS

| 5,966,509 | A  | * | 10/1999 | Abe et al. ................... 714/4 |
| 6,711,578 | B1 |   | 3/2004  | McCaw et al. |
| 7,024,214 | B2 |   | 4/2006  | Loveland |
| 7,155,448 | B2 | * | 12/2006 | Winter ....................... 711/4 |
| 7,325,160 | B2 | * | 1/2008  | Tsao ......................... 714/15 |
| 7,415,486 | B2 |   | 8/2008  | Multer |
| 7,680,831 | B1 | * | 3/2010  | Gandhi et al. ............. 707/999.2 |

* cited by examiner

*Primary Examiner* — Viet Vu
(74) *Attorney, Agent, or Firm* — Schmeiser, Olsen & Watts; John R. Pivnichny

(57) ABSTRACT

A method and system for recovering data from an aborted session via a rule application. A first session having a first document ID is initiated. After an interruption of the first session, a second session having a second document ID is initiated. The first and second document IDs are determined to be identical. The first session is determined to be open in a callee application after the interruption. A rule that associates a recovery action with a data item of the first document is applied by detecting the data item of the first document and selecting the recovery action from multiple predefined recovery actions. The data item of the first document is an identification of a calling application that provides the first and second documents or a value entered by a user of the calling application. The callee application performs the selected recovery action.

20 Claims, 12 Drawing Sheets

US 7,979,540 B2

CONFIGURABLE RECOVERY OF ABORTED SESSION DATA

FIELD OF THE INVENTION

The present invention relates to a data processing method and system for rule-based recovery of data after an aborted session, and more particularly to a technique for post-interruption synchronization of accounting data associated with a purchasing document.

BACKGROUND OF THE INVENTION

Conventionally, out-of-synch data in calling and callee applications is resolved by discarding all in-process data out of the callee application and starting from scratch with data sent from the calling application. This known approach to resolving out-of-synch data is inconvenient for users whose data entries prior to a session interruption are discarded. Furthermore, the conventional out-of-synch data resolution scheme interferes with a desirable seamlessness between the calling application and the callee application. Thus, there exists a need to overcome at least one of the preceding deficiencies and limitations of the related art.

SUMMARY OF THE INVENTION

The present invention provides a computer-implemented method of recovering data from an aborted session via an application of a rule. A callee application initiates a first session having a first session identifier (ID) and a first document ID that identifies a first document provided by a calling application executed by a first computing system. The callee application is executed by a second computing system. The first document has M data items identified by M data item identifiers in a one-to-one correspondence. The M data items have sequential positions within the first document that are identified by M sequence numbers in a one-to-one correspondence. The callee application initiates a second session having a second session ID and a second document ID that identifies a second document provided by the calling application. The second session is initiated after the first session is interrupted without the callee application terminating the first session. The second document has N data items identified by N data item identifiers in a one-to-one correspondence. The N data items have sequential positions within the second document that are identified by N sequence numbers in a one-to-one correspondence. The callee application determines that the first document ID is identical to the second document ID after the second session is initiated. The callee application applies a rule in response to determining that the first document ID is identical to the second document ID. The rule associates a recovery action of multiple predefined recovery actions with a data item of the first document. Applying the rule includes detecting the data item of the first document and in response to the detecting, selecting the recovery action from the multiple predefined recovery actions. The data item of the first document is an identification of the calling application that is a metadata item that is not included in the M data items or a value entered for a data item of the M data items by an end user of the calling application. The callee application performs the recovery action. A result of performing the recovery action is a display on a display device. The display is a display of at least one data item of the M data items, a display of at least one data item of the N data items, a display of an indication that no data item of the M data items or the N data items is being processed in the second session, or a combination thereof.

A system, computer program product, and process for supporting computing infrastructure corresponding to the above-summarized method are also described and claimed herein.

The present invention may apply a rule to provide a configurable selection of a recovery action from multiple predefined recovery actions, where the selected recovery action recovers one or more data items from aborted session data.

DETAILED DESCRIPTION OF THE INVENTION

Overview

Figure 1:
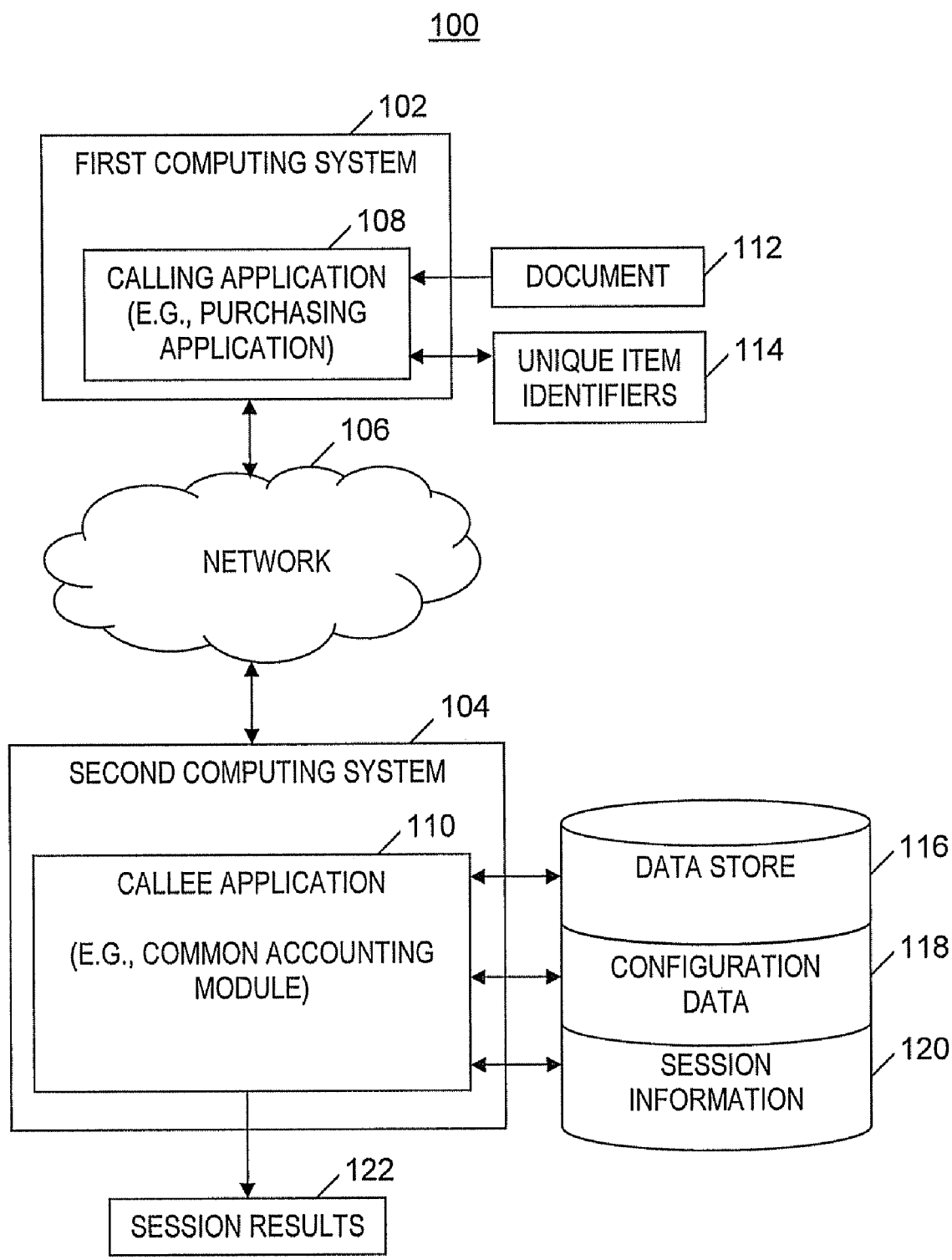
FIG. 1 is a block diagram of a system for rule-based recovery of aborted session data, in accordance with embodiments of the present invention.

Data (e.g., accounting data) for a single document (e.g., purchasing document) passing between a calling application and a callee application may become out-of-synch as a result of an aborted session (a.k.a. interrupted session; e.g., a session time-out or a session interruption, such as a system halt caused by a power outage). Although the calling application owns the data, the callee application temporarily persists the data as the data is being gathered. Thus, the callee application still includes the aborted session data as in-process data. Instead of requiring the callee application to always discard the in-process data and start from scratch only with data sent from the calling application in a new session, the present invention provides a configurable, rule-based recovery of data from the aborted session. A system and method described herein may provide a selection of a recovery action from multiple predefined recovery actions based on attributes of the calling application (e.g., identifier of the calling application) and/or data included in a document passed from the calling application to the callee application. The selection of the recovery action is made in response to the callee application determining that an identifier of the document sent in the aborted session is the same as the identifier of a document sent in the new session and that the aborted session still remains open in the callee application.

In one embodiment, the recovery action is selected from a group of three predefined recovery actions. The first recovery action that may be selected replaces all data from the aborted session with new session data. The second recovery action that may be selected creates a best fit between aborted session data and data from the new session document by copying the data items from the aborted session to data items of the new session based on matching item sequence numbers that specify sequential positions in the document sent in the aborted session and in the new session. The third recovery action that may be selected is a merge of the aborted session data with the new session data that employs unique item identifiers that identify data items in a one-to-one correspondence and remain uniquely associated with the data items even after item sequence numbers change as one or more data items are deleted and/or added in the new session. For example, three data items are added to a document. The first, second and third data items of the three added data items have item sequence numbers 1, 2 and 3, respectively, and unique item identifiers 001, 002, and 003, respectively. The second data item is then deleted, resulting in the item sequence numbers for the remaining two data items becoming 1 and 2. The unique item identifiers for the remaining two data items, however, do not change from their original 001 and 003. Using the merge technique, a data item from the aborted session is copied to a data item in the new session if there is a match between the corresponding unique item identifiers.

As used herein, a document is defined as a collection of related data elements produced by a computer application (e.g., calling application). In one embodiment, one calling application generates related data elements of a first purchasing document in the form of a payment request and another calling application generates related data elements of a second purchasing document in the form of a requisition from an online shopping cart. For example, a document is a set of related data elements stored in multiple related database tables (e.g., DB2® tables). As used herein, a rule (e.g., business rule) is defined as a requirement of a business entity (e.g., a corporation). As used herein, a session is defined as a period of time between the callee application processing a request from the calling application to initiate an information exchange between the calling application and the callee application and the callee application processing a request from the calling application to terminate the information exchange.

Rule-Based Aborted Session Data Recovery System

FIG. 1 is a block diagram of a system for rule-based recovery of aborted session data, in accordance with embodiments of the present invention. System 100 may include a first computing system 102 and a second computing system 104 that transmit and share data via a network 106 (e.g., the Internet). First computing system 102 may execute a calling application 108 and second computing system 104 may execute a callee application 110 to support configurable recovery of data from an aborted session that utilizes the calling and callee applications. A business entity (e.g., corporation) utilizes calling application 108 to request processing of data elements extracted from a document 112. In one embodiment, document 112 is a purchasing document that may be in the form of a payment request or a requisition from an online shopping cart. Unique item identifiers 114 are managed by calling application 108. Each item identifier uniquely identifies a data item (a.k.a. data element) included in document 112. Unique item identifiers 114 are required to implement the merge action, which is described below relative to FIGS. 2A-2B and FIG. 5.

Data elements in document 112 and unique item identifiers 114 may be stored in one or more computer data storage units that are coupled to first computing system 102 and that are accessible by calling application 108.

In response to establishing a user session for utilizing the processing of callee application 110 via calling application 108, callee application 110 receives and stores data elements from document 112 in data store 116. Callee application 110 has access to configuration data 118, which specifies business rules that indicate which type of aborted session data recovery is used in the process of FIGS. 2A-2B. Furthermore, callee application 110 stores an identifier (i.e., session ID) of a user session and an identifier (i.e., document ID) of document 112 in session information 120. Configuration data 118 is stored in one or more database tables (e.g., one or more relational database tables) that reside on one or more computer data storage units that may be coupled to second computing system 104 or to another computing system. In one embodiment, a database table storing configuration data 118 stores a session status and possible actions that recover data from an aborted session. In one embodiment, a database table storing configuration data 118 associates an action for recovering data from an aborted session with a data item in data store 116 that was received from document 112 (e.g., an identifier of the calling application 108 or an identifier of the type of document 112). Session information 120 is also stored in one or more computer data storage units that may be coupled to second computing system 104 or to another computing system.

The results of a session (i.e., session results 122) are generated by callee application 110 for display to an end user of calling application 108 via a display device (not shown). In one embodiment, results 122 may include: (1) at least one data item included in document 112 prior to the session interruption and no additional data items included in document 112 after the session interruption; (2) at least one data item included in document 112 after the session interruption and no additional data items included in document 112 prior to the session interruption; (3) at least one data item included in document 112 prior to the session interruption and at least one data item included in document 112 after the session interruption; or (4) an indication that no data items in document 112 are being currently processed in the new session.

As one example of system 100, the callee application 110 is a common accounting application (CAM) that supports multiple calling applications including calling application 108, where each calling application is a purchasing (i.e., procurement) application. During a session (i.e., user session) in which an end user is utilizing one of the multiple purchasing applications, the end user enters and/or views accounting data that is processed by CAM. In this example, if the user session is interrupted (e.g., by a session time-out or a computing system halt), then accounting data in the purchasing application in a subsequent user session may fall out of synch with accounting data already processed and stored by CAM. The identification and selection of an appropriate action to recover accounting data from the interrupted user session is described below relative to FIGS. 2A-2B.

In one embodiment, system 100 is implemented by an integrated web application environment in which data is shared between calling application 108 and callee application 110 via a web service. In this embodiment, first computing system 102 includes a web browser (not shown).

Further details about the functionality of the components of system 100 are included in the discussion below relative to FIGS. 2A-2B and FIGS. 3-5.

Rule-Based Aborted Session Data Recovery Process

Figure 2A:
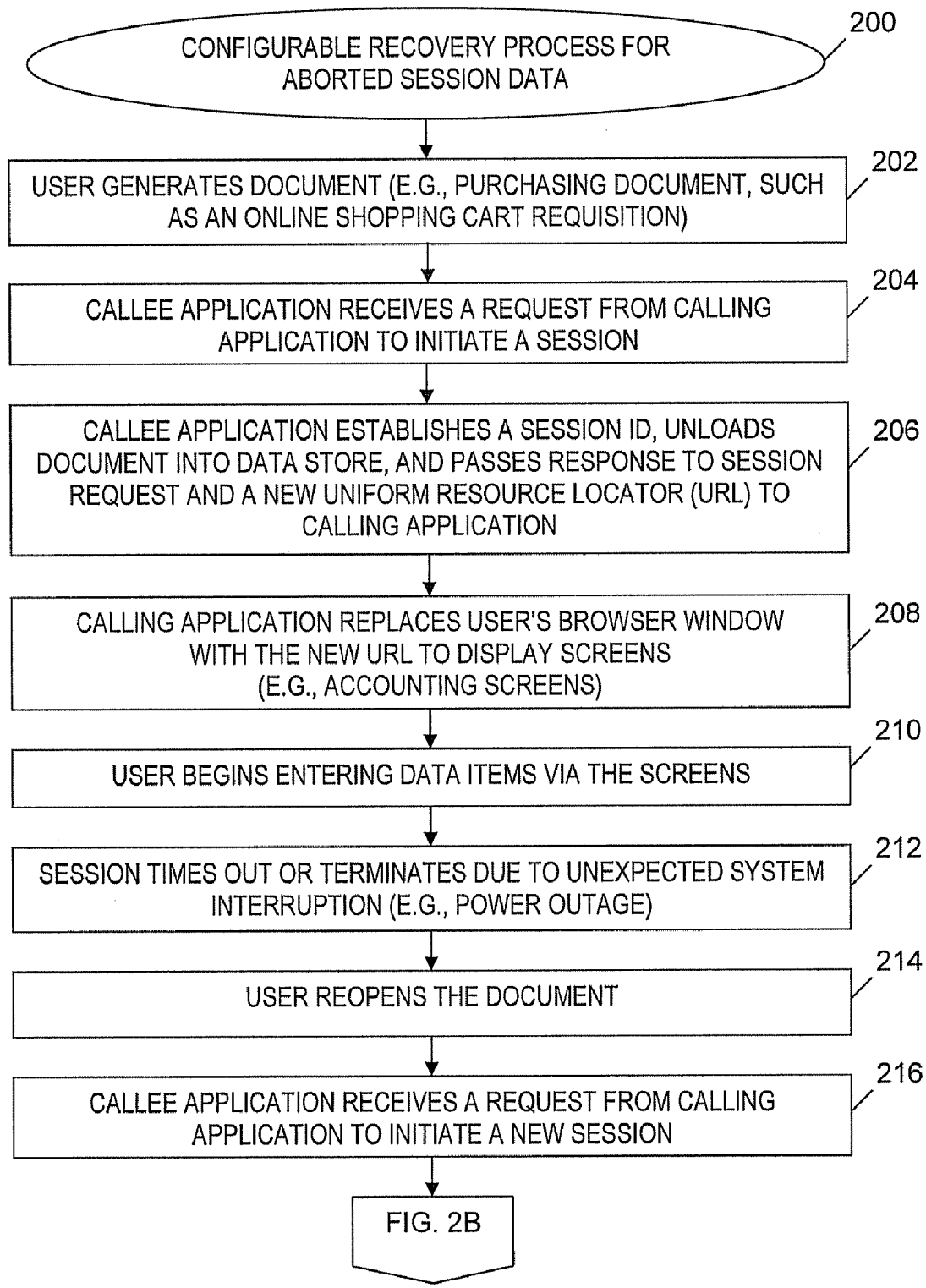
FIGS. 2A-2B depict a flowchart of a process for rule-based recovery of aborted session data, in accordance with embodiments of the present invention.
Figure 2B:
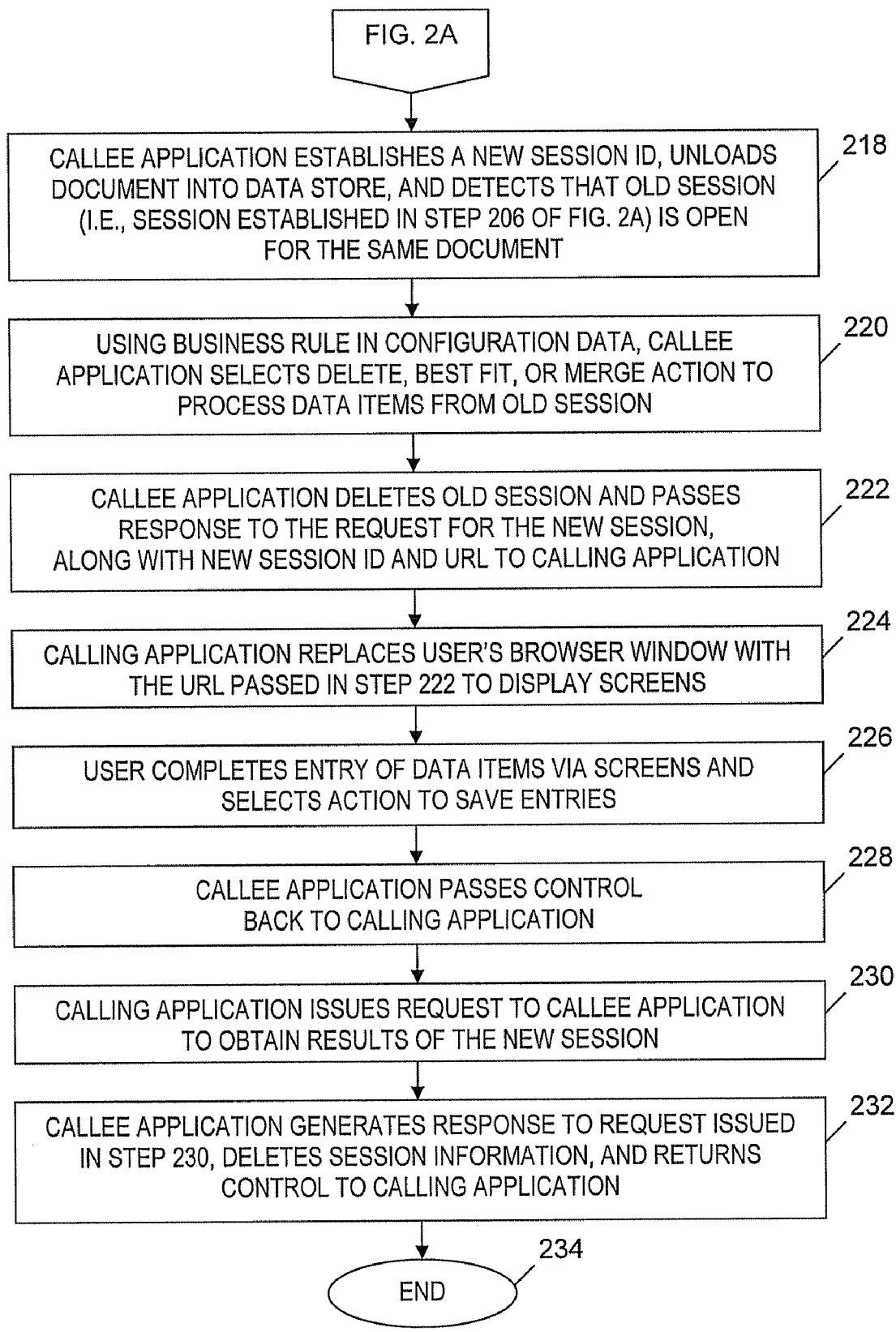

FIGS. 2A-2B depict a flowchart of a process for rule-based recovery of aborted session data, in accordance with embodiments of the present invention. The rule-based aborted session data recovery process starts at step 200 of FIG. 2A. In step 202, a user associated with a business entity generates document 112 (see FIG. 1) (e.g., a purchasing document such as an online shopping cart requisition). In step 204, callee application 110 (see FIG. 1) receives a request (a.k.a. session request) from calling application 108 (see FIG. 1) to initiate a session (i.e., user session; e.g., an accounting session) for an end user of calling application 108 (see FIG. 1). Document 112 and an identifier (i.e., document ID) of document 112 are also sent by calling application 108 (see FIG. 1) to callee application 110 (see FIG. 1). Hereinafter in this section, the user session requested in step 204 is referred to as "the session."

In step 206, callee application 110 (see FIG. 1) establishes an identifier (i.e., session ID) for the session, unloads document 112 (see FIG. 1) into data store 116 (see FIG. 1), and passes a response to the session request and a new uniform resource locator (URL) back to calling application 108 (see FIG. 1). In one embodiment, the unloading of document 112 (see FIG. 1) in step 206 includes the unloading of data item(s) included in the document and information about the document, such as an identifier of the particular calling application that sent the document and/or an identifier of the type of the document.

In step 208, calling application 108 (see FIG. 1) replaces the end user's browser window with the new URL passed in step 206 to display a sequence of screens (e.g., accounting screens) for entry of data items (e.g., accounting items) to be processed by callee application 110 (see FIG. 1).

In step 210, the end user enters one or more data items via the sequence of screens displayed by the new URL passed in step 206. In one embodiment, step 210 includes the end user entering accounting information via a sequence of accounting screens.

In step 212, the session times out or terminates due to an unexpected system interruption of computing system 102 (see FIG. 1). Step 212 occurs prior to the end user selecting an action (e.g., Save and Return, Save and Submit, or Cancel) that indicates the completion of data entry or the end of the session. For example, a power outage causes the session to terminate in step 212 after the end user started an entry of accounting items but before the end user completed the entry of all of the accounting items.

In step 214, the end user reopens the document 112 (see FIG. 1). In step 216, callee application 110 (see FIG. 1) receives a request (i.e., new session request) from calling application 108 (see FIG. 1) to initiate a new session (e.g., a new accounting session). Step 216 also includes callee application 110 (see FIG. 1) receiving document 112 (see FIG. 1) (e.g., a purchasing document) and the document ID of document 112 (see FIG. 1) from calling application 108 (see FIG. 1). After step 216, the configurable aborted session data recovery process continues with step 218 of FIG. 2B.

In step 218, callee application 110 (see FIG. 1) establishes a new session ID that identifies the new session being initiated by the request in step 216. In step 218, the callee application also unloads document 112 (see FIG. 1) into data store 116 (see FIG. 1), and detects that an old session (i.e., the session requested in step 204 of FIG. 2A) is open and has the same document ID as the document ID received in step 216 (see FIG. 2A). In one embodiment, the unloading of document 112 (see FIG. 1) in step 218 includes the unloading of data item(s) included in the document and information about the document, such as an identifier of the particular calling application that sent the document and/or an identifier of the type of the document. Step 220 is performed in response to the callee application detecting that the old session is open and that the document ID for the old session is the same as the document ID received in step 216 (see FIG. 2A).

In step 220, using an application of a business rule included in configuration data 118 (see FIG. 1), callee application 110 (see FIG. 1) selects an action to process data from the old session. In one embodiment, the action selected in step 220 is either a delete action, a best fit action, or a merge action. In another embodiment, the action selected in step 220 is either a best fit action or a merge action.

In one embodiment, the application of the business rule in step 220 includes the callee application 110 (see FIG. 1) retrieving an identifier of an action (e.g., delete, best fit or merge action) from a database table based on an association in the database table between the action and information included in document 112 (see FIG. 1). The information in document 112 (see FIG. 1) that is associated with the action may be data entered in the document or metadata (e.g., an identifier of calling application 108 of FIG. 1).

In response to the selection in step 220, one or more of the data items of the new session that are stored in data store 116 (see FIG. 1) may be replaced by copying one or more of the data items (i.e., old session data; e.g., accounting items) entered in step 210 (see FIG. 2A), the one or more data items of the new session may replace the old session data, and/or one or more data items of the old session data may be deleted from data store 116 (see FIG. 1). Selections of the delete, best fit, and merge actions in step 220 are further described below relative to FIG. 3, FIG. 4, and FIG. 5, respectively.

In step 222, callee application 110 (see FIG. 1) deletes information about the old session from data store 116 (see FIG. 1), including the data item(s) entered in step 210 (see FIG. 2A), and passes a response to the new session request back to calling application 108 (see FIG. 1), along with an identifier (i.e., new session ID) of the new session and a URL. In step 224, calling application 108 (see FIG. 1) replaces the end user's browser window with the URL passed in step 222 to display of a sequence of screens (e.g., accounting screens).

In step 226, the end user completes entry of data items via the sequence of screens displayed by the URL passed in step 222 and selects an action to save the entered data items. In step 228, callee application 110 (see FIG. 1) passes control back to calling application 108 (see FIG. 1).

In step 230, calling application 108 (see FIG. 1) issues a request to callee application 110 (see FIG. 1) to obtain results 122 (see FIG. 1) of the new session. In step 232, callee application 110 (see FIG. 1) generates a response to the request issued in step 230 that includes results 122 (see FIG. 1), deletes session information (i.e., information about the new session) from data store 116 (see FIG. 1) and session information 120 (see FIG. 1), and returns control to calling application 108 (see FIG. 1). The results 122 (see FIG. 1) are displayed on a display device coupled to computing system 102 (see FIG. 1) or to another computing system. Results 122 include at least one data item of the data items of document 112 (see FIG. 1) generated in step 202 (see FIG. 2A), at least one data item of the data items of document 112 (see FIG. 1) reopened in step 214 (see FIG. 2A), or an indication that no data item of the data items of document 112 (see FIG. 1) generated in step 202 (see FIG. 2A) and reopened in step 214 (see FIG. 2A) is being processed in the new session. The configurable aborted session data recovery process ends at step 234.

Delete Action

Figure 3:
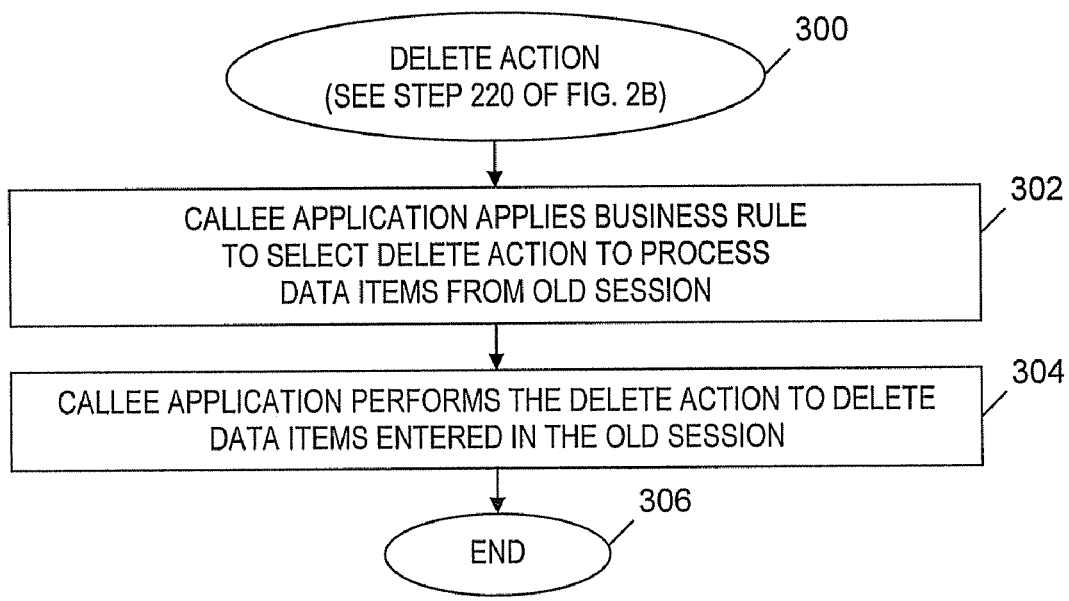
FIG. 3 is a flowchart of a process for using a business rule to select and perform a delete action in the process of FIGS. 2A-2B, in accordance with embodiments of the present invention.

FIG. 3 is a flowchart of a process for using a business rule to select and perform a delete action in the process of FIGS. 2A-2B, in accordance with embodiments of the present invention. The delete action process begins at step 300 as part of step 220 of FIG. 2B. In step 302, callee application 110 (see FIG. 1) applies a business rule included in configuration data 118 (see FIG. 1) to select the delete action to process data items from the old session (i.e., the session requested in step 204 of FIG. 2A). In one embodiment, the application of the business rule in step 302 matches an identifier of calling application 108 (see FIG. 1) to the delete action, where the identifier of the calling application is included in data store 116 (see FIG. 1) as a result of step 206 (see FIG. 2A). In another embodiment, the application of the business rule in step 302 matches one or more data entries in document 112 (see FIG. 1) to the delete action.

In step 304, callee application 110 (see FIG. 1) performs the delete action, which deletes the data items (e.g., accounting items) entered in the old session, including the data items entered in step 210 of FIG. 2A. That is, the data item(s) in the document reopened in step 214 (see FIG. 2A) replace the data item(s) entered in the old session, so that the data item(s) in the new session document are processed in the new session without any copying of old session data item(s) to new session data item(s). The delete process ends at step 306.

Best Fit Action

Figure 4:
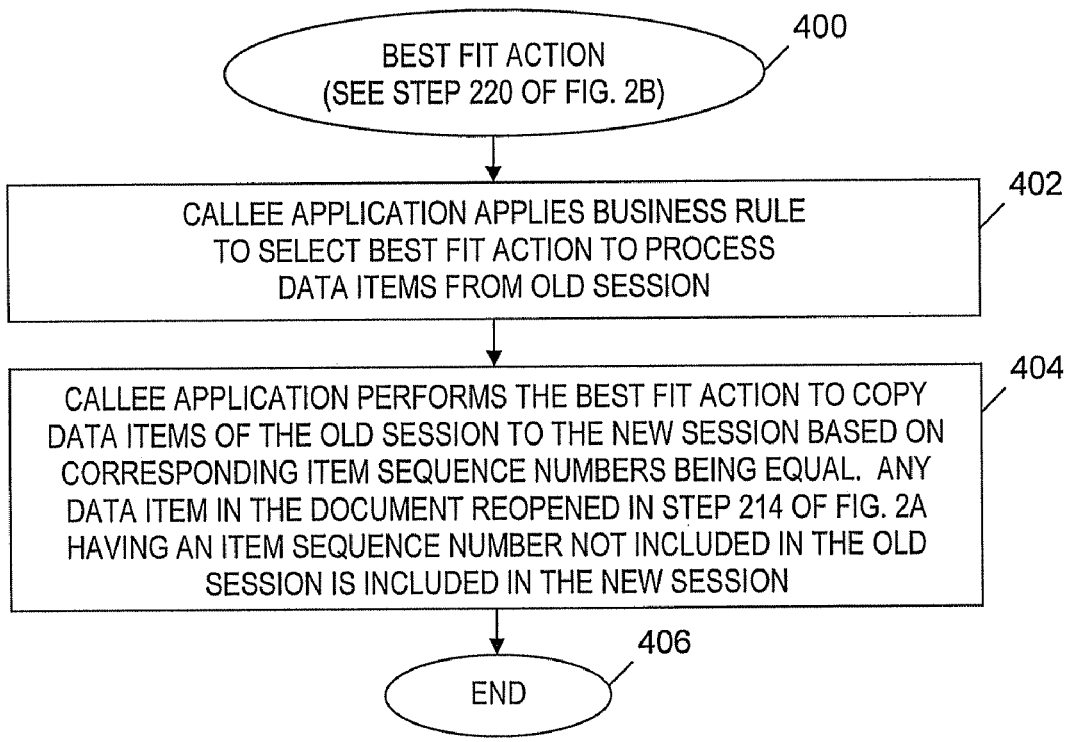
FIG. 4 is a flowchart of a process for using a business rule to select and perform a best fit action in the process of FIGS. 2A-2B, in accordance with embodiments of the present invention.

FIG. 4 is a flowchart of a process for using a business rule to select and perform a best fit action in the process of FIGS. 2A-2B, in accordance with embodiments of the present invention. The best fit action process begins at step 400 as part of step 220 of FIG. 2B. In step 402, callee application 110 (see FIG. 1) applies a business rule included in configuration data 118 (see FIG. 1) to select the best fit action to process data items from the old session (i.e., the session requested in step 204 of FIG. 2A). In one embodiment, the application of the business rule in step 402 matches an identifier of calling application 108 (see FIG. 1) to the best fit action, where the identifier of the calling application is included in data store 116 (see FIG. 1) as a result of step 206 (see FIG. 2A). In another embodiment, the application of the business rule in step 402 matches one or more data entries in document 112 (see FIG. 1) to the best fit action.

In step 404, callee application 110 (see FIG. 1) performs the best fit action, which copies one or more data items (e.g., accounting items) entered in the old session to one or more items in the new session based on corresponding item sequence numbers being equal. That is, callee application 110 (see FIG. 1) checks item sequence numbers of all data items in the document reopened in step 214 (see FIG. 2A) against item sequence numbers of data items of the old session (i.e., data items processed by the callee application in the old session) to determine if there are any matches between the item sequence numbers. If callee application 110 (see FIG. 1) determines that an item sequence number of a data item in the document reopened in step 214 (see FIG. 2A) is equal to an item sequence number of a data item of the old session, then the callee application copies the data item of the old session to the data item of the new session that has the same item sequence number. Any data item that is in the document reopened in step 214 (see FIG. 2A) and that has an item sequence number that is not included in the old session is included in the new session as a new data item. The best fit process ends at step 406.

The following discussion of three scenarios in this section considers that there are M data items (i.e., old data item 1 . . . old data item M) entered in the old session via a first document generated in step 202 (see FIG. 2A) and N data items (i.e., new data item 1 . . . new data item N) in the document (i.e., a second document) reopened in step 214 (see FIG. 2A). Further, the sequential positions of the M data items in the first document are identified by M item sequence numbers (i.e., old item sequence number 1 . . . old item sequence number M) in a one-to-one correspondence. Still further, the sequential positions of the N data items in the second document are identified by N item sequence numbers (i.e., new item sequence number 1 . . . new item sequence number N) in a one-to-one correspondence.

In the first scenario of this section, M=N and step 404 copies the M data items to the N data items by performing the following steps for i=1 . . . M: (1) identifying an old item sequence number i that equals a new item sequence number i, where the old item sequence number i is included in old item sequence number 1 . . . old item sequence number M and the new item sequence number i is included in new item sequence 1 . . . new item sequence number N; (2) in response to step (1), copying an old data item i to a new data item i, where the old data item i is identified by the old item sequence number i and the new data item i is identified by the new item sequence number i.

In the second scenario of this section, M<N and step 404 recovers one or more data items of the M data items by performing the following two steps for i=1 . . . M: (1) identifying an old item sequence number i that equals a new item sequence number i, where old item sequence number i is included in old item sequence number 1 . . . old item sequence number M and the new item sequence number i is included in new item sequence number 1 . . . new item sequence number M of the N item sequence numbers; and (2) in response to step (1), copying an old data item i to a new data item i, where the old data item i is identified by the old item sequence number i and the new data item i is identified by the new item sequence number i. After the aforementioned steps (1) and (2) are performed in the second scenario, the (M+1)-th data item through the N-th data item (i.e., the data items identified by the (M+1)-th through the N-th item sequence numbers of the N item sequence numbers) in the new session are included and processed in the new session as new data item(s).

In the third scenario of this section, M>N and step 404 recovers one or more data items of the M data items by performing the following steps for i=1 . . . N: (1) identifying an old item sequence number i that equals a new item sequence number i, where old item sequence number i is included in old item sequence number 1 . . . old item sequence number N of the M item sequence numbers and the new item sequence number i is included in the N item sequence numbers; and (2) in response to step (1), copying an old data item i to a new data item i, where the old data item i is identified by the old item sequence number i and the new data item i is identified by the new item sequence number i. After the aforementioned steps (1) and (2) are performed in the third scenario, the (N+1)-th data item through the M-th data item (i.e., the data items identified by the (N+1)-th through the M-th item sequence numbers of the M items sequence numbers) are deleted from the new session (i.e., deleted from data store 116 of FIG. 1).

Merge Action

Figure 5:
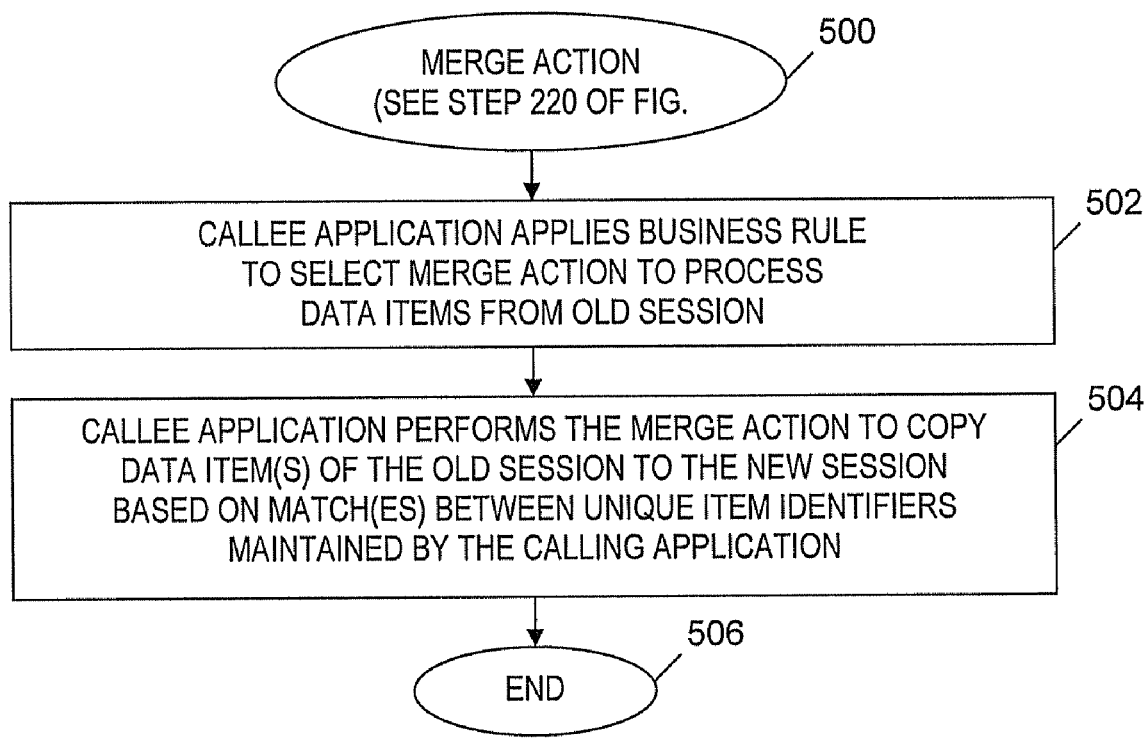
FIG. 5 is a flowchart of a process for using a business rule to select and perform a merge action in the process of FIGS. 2A-2B, in accordance with embodiments of the present invention.

FIG. 5 is a flowchart of a process for using a business rule to select and perform a merge action in the process of FIGS. 2A-2B, in accordance with embodiments of the present invention. The merge action process begins at step 500 as part of step 220 of FIG. 2B. In step 502, callee application 110 (see FIG. 1) applies a business rule included in configuration data 118 (see FIG. 1) to select the merge action to process data items from the old session (i.e., the session requested in step 204 of FIG. 2A). In one embodiment, the application of the business rule in step 502 matches an identifier of calling application 108 (see FIG. 1) to the merge action, where the identifier of the calling application is included in data store 116 (see FIG. 1) as a result of step 206 (see FIG. 2A). In another embodiment, the application of the business rule in step 502 matches one or more data entries in document 112 (see FIG. 1) to the best fit action.

In step 504, callee application 110 (see FIG. 1) performs the merge action, which copies one or more data items (e.g., accounting items) entered in the old session to one or more items in the new session if match(es) between unique item identifiers 114 (see FIG. 1) (a.k.a. unique item IDs) are identified. In one embodiment, callee application 110 (see FIG. 1) searches data store 116 (see FIG. 1) and checks unique item IDs of all data items in the document reopened in step 214 (see FIG. 2A) against unique item IDs of data items of the old session to determine if there are any matches between the unique item IDs. If callee application 110 (see FIG. 1) determines that a unique item ID of a data item in the document reopened in step 214 (see FIG. 2A) is equal to a unique item ID of a data item of the old session, then the callee application copies the data item of the old session to the data item of the new session that has the same unique item ID. In one embodiment, any copying of the data item of the old session in step 504 is performed by copying over (i.e., replacing) the data item of the new session in data store 116 (see FIG. 1), where the data item of the new session is identified by the same unique item ID that identifies the data item of the old session. Any data item that is in the document reopened in step 214 (see FIG. 2A) and that is identified by a unique item ID that is not included in the old session is retained in the new session (i.e., retained in data store 116 of FIG. 1). Further, any data item of the old session that is identified by a unique item ID that is not included in the document reopened in step 214 (see FIG. 2A) is deleted from the new session (i.e., deleted from data store 116 of FIG. 1) by callee application 110 (see FIG. 1). The best fit process ends at step 506.

EXAMPLES

Figure 6:
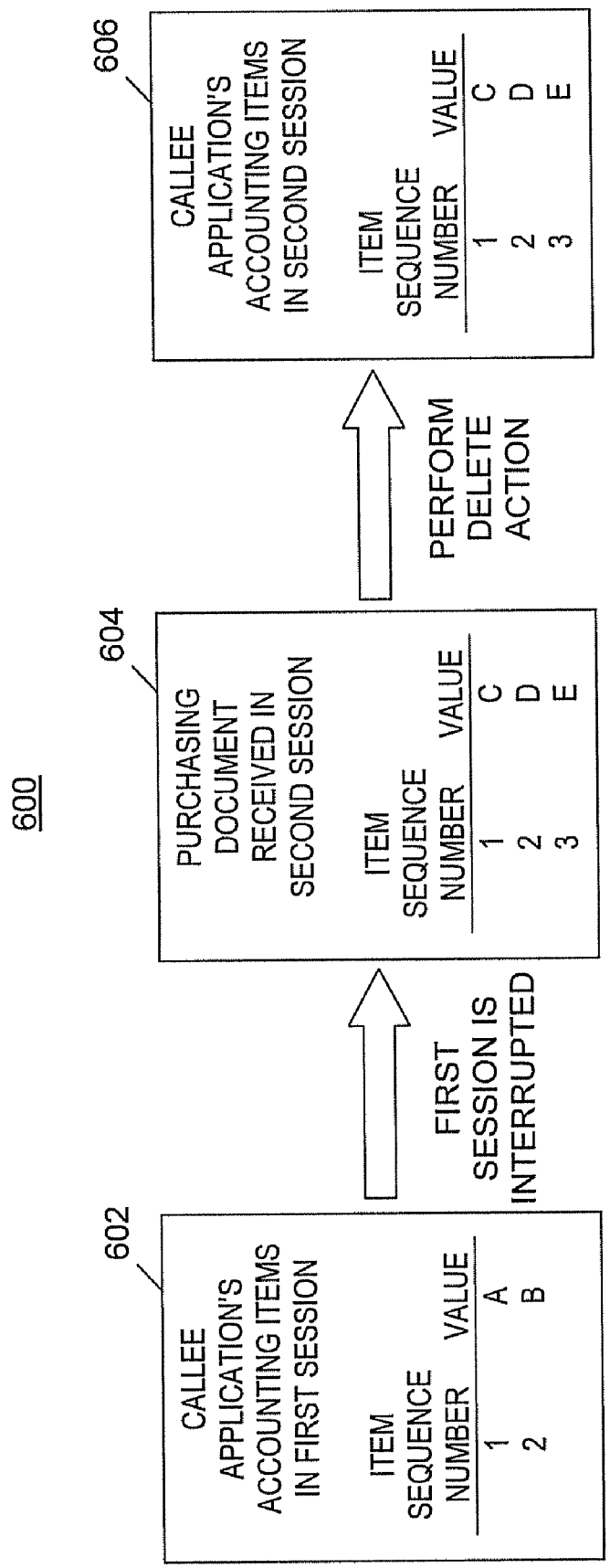
FIG. 6 depicts an example of the rule-based recovery process of FIGS. 2A-2B performing the delete action of FIG. 3, in accordance with embodiments of the present invention.

FIG. 6 depicts an example of the rule-based recovery process of FIGS. 2A-2B performing the delete action of FIG. 3, in accordance with embodiments of the present invention. Example 600 includes accounting items 602 that are processed by callee application 110 (see FIG. 1) in a first user session. Accounting items 602 include an accounting item "A" identified by item sequence number 1 and an accounting item "B" identified by item sequence number 2. After the first session is interrupted unexpectedly, the callee application 110 (see FIG. 1) establishes a second session and purchasing document 604 is received by the callee application in the second session. Purchasing document 604 is an example of document 112 (see FIG. 1) and is a result of an end user deleting accounting items "A" and "B" and adding accounting items "C", "D" and "E". In step 302 (see FIG. 3), the callee application 110 (see FIG. 1) applies a business rule included in configuration data 118 (see FIG. 1). The application of the business rule selects the delete action from among the choices of a delete action, a best fit action and a merge action based on an identifier of calling application 108 (see FIG. 1) or other information included in purchasing document 604. The callee application 110 (see FIG. 1) performs the delete action in step 304 (see FIG. 3), which deletes the "A" and "B" accounting items (i.e., does not include "A" and "B" in the second session) and includes the "C", "D" and "E" accounting items in the second session. The result of performing the delete action is shown as accounting items 606.

Figure 7A:
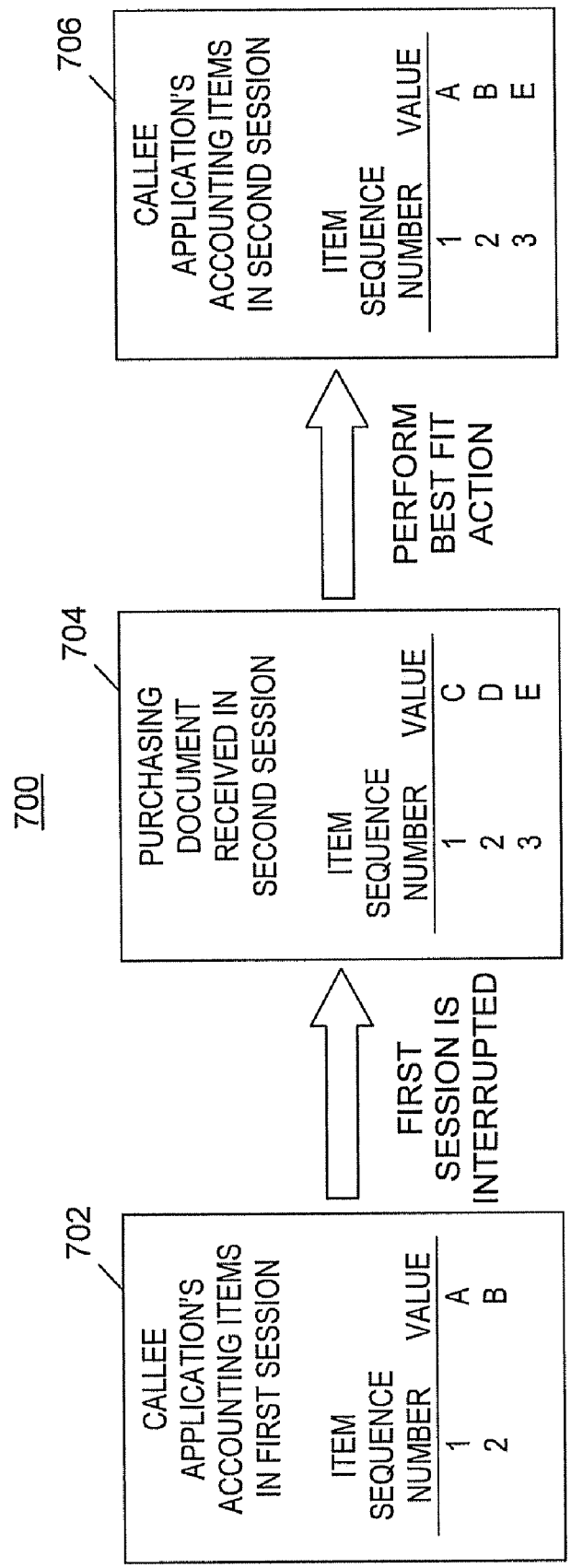
FIG. 7A depicts a first example of the rule-based recovery process of FIGS. 2A-2B performing the best fit action of FIG. 4, where a number of accounting items in a first session is less than a number of items in a purchasing document received in a second session, in accordance with embodiments of the present invention.

FIG. 7A depicts a first example of the rule-based recovery process of FIGS. 2A-2B performing the best fit action of FIG. 4, where a number of accounting items in a first session is less than a number of items in a purchasing document received in a second session, in accordance with embodiments of the present invention. Example 700 includes accounting items 702 that are processed by callee application 110 (see FIG. 1) in a first user session. Accounting items 702 include an accounting item "A" identified by item sequence number 1 and an accounting item "B" identified by item sequence number 2. After the first session is interrupted unexpectedly, the callee application 110 (see FIG. 1) establishes a second session and purchasing document 704 is received by the callee application in the second session. Purchasing document 704 is an example of document 112 (see FIG. 1) and is a result of an end user deleting accounting items "A" and "B" and adding accounting items "C", "D" and "E".

In step 402 (see FIG. 4), the callee application 110 (see FIG. 1) applies a business rule included in configuration data 118 (see FIG. 1). The application of the business rule selects the best fit action from among the choices of a delete action, a best fit action and a merge action based on an identifier of calling application 108 (see FIG. 1) or other information included in purchasing document 704.

The callee application 110 (see FIG. 1) performs the best fit action in step 404 (see FIG. 4), which results in the set of accounting items 706. Performing the best fit action in example 700 copies the "A" accounting item having item sequence number 1 in the first session to the accounting item in the second session having the same item sequence number. Similarly, the callee application copies the "B" accounting item having item sequence number 2 in the first session to the accounting item in the second session having the same item sequence number. Furthermore, since accounting items 702 include no match for item sequence number 3 in purchasing document 704, the callee application 110 (see FIG. 1) includes accounting item "E" in the accounting items 706 as a new accounting item having item sequence number 3 in the second session.

Figure 7B:
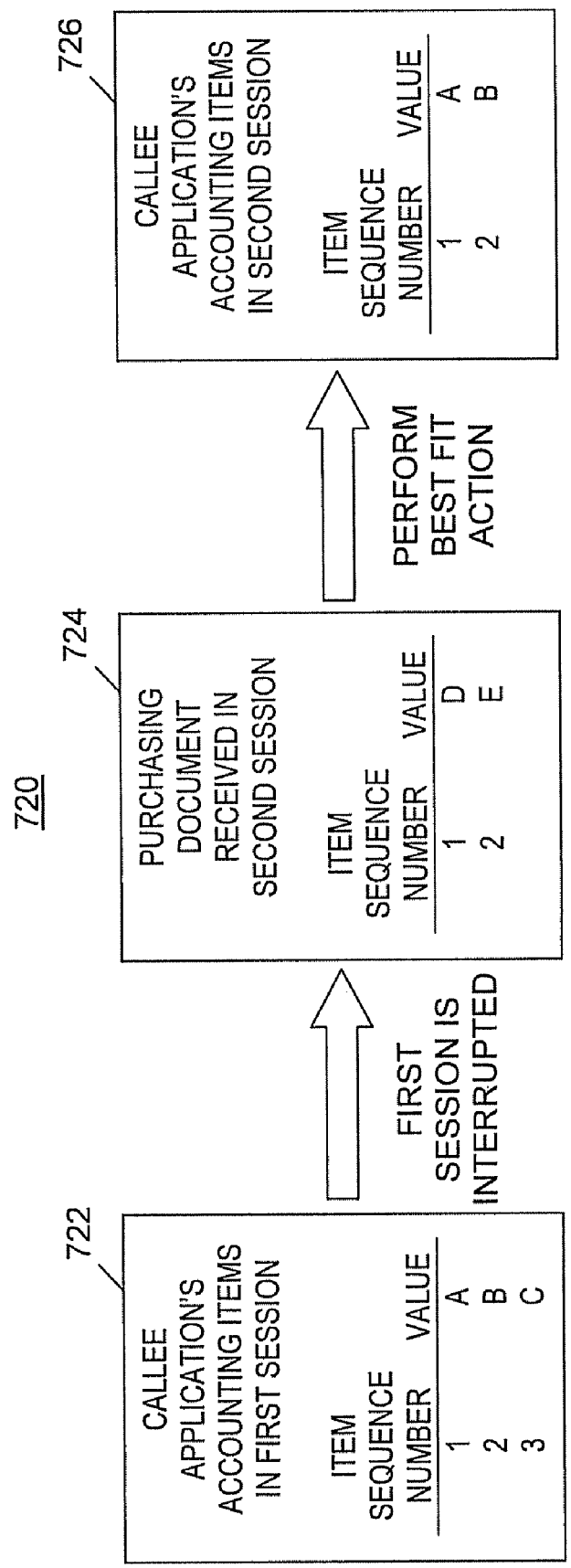
FIG. 7B depicts a second example of the rule-based recovery process of FIGS. 2A-2B performing the best fit action of FIG. 4, where a number of accounting items in a first session is greater than a number of items in a purchasing document received in a second session, in accordance with embodiments of the present invention.

FIG. 7B depicts a second example of the rule-based recovery process of FIGS. 2A-2B performing the best fit action of FIG. 4, where a number of accounting items in a first session is greater than a number of items in a purchasing document received in a second session, in accordance with embodiments of the present invention. Example 720 includes accounting items 722 that are processed by callee application 110 (see FIG. 1) in a first user session. Accounting items 722 include accounting items "A", "B" and "C" identified by item sequence numbers 1, 2 and 3, respectively. After the first session is interrupted unexpectedly, the callee application 110 (see FIG. 1) establishes a second session and a purchasing document 724 is received by the callee application in the second session. Purchasing document 724 is an example of document 112 (see FIG. 1) and is a result of an end user deleting accounting items "A", "B" and "C" and adding accounting items "D" and "E".

In step 402 (see FIG. 4), the callee application 110 (see FIG. 1) applies a business rule included in configuration data 118 (see FIG. 1). The application of the business rule selects the best fit action from among the choices of a delete action, a best fit action and a merge action based on an identifier of calling application 108 (see FIG. 1) or other information included in purchasing document 724.

The callee application 110 (see FIG. 1) performs the best fit action in step 404 (see FIG. 4) which results in a set of accounting items 726. Performing the best fit action in example 720 copies the "A" accounting item having item sequence number 1 in the first session to the accounting item in the second session having the same item sequence number 1. Similarly, the callee application copies the "B" accounting item having item sequence number 2 in the first session to the accounting item in the second session having the same item sequence number 2. Furthermore, since purchasing document 724 includes no match for item sequence number 3 in accounting items 722, the callee application 110 (see FIG. 1) does not include accounting item "C" in the accounting items 726 in the second session.

Figure 7C:
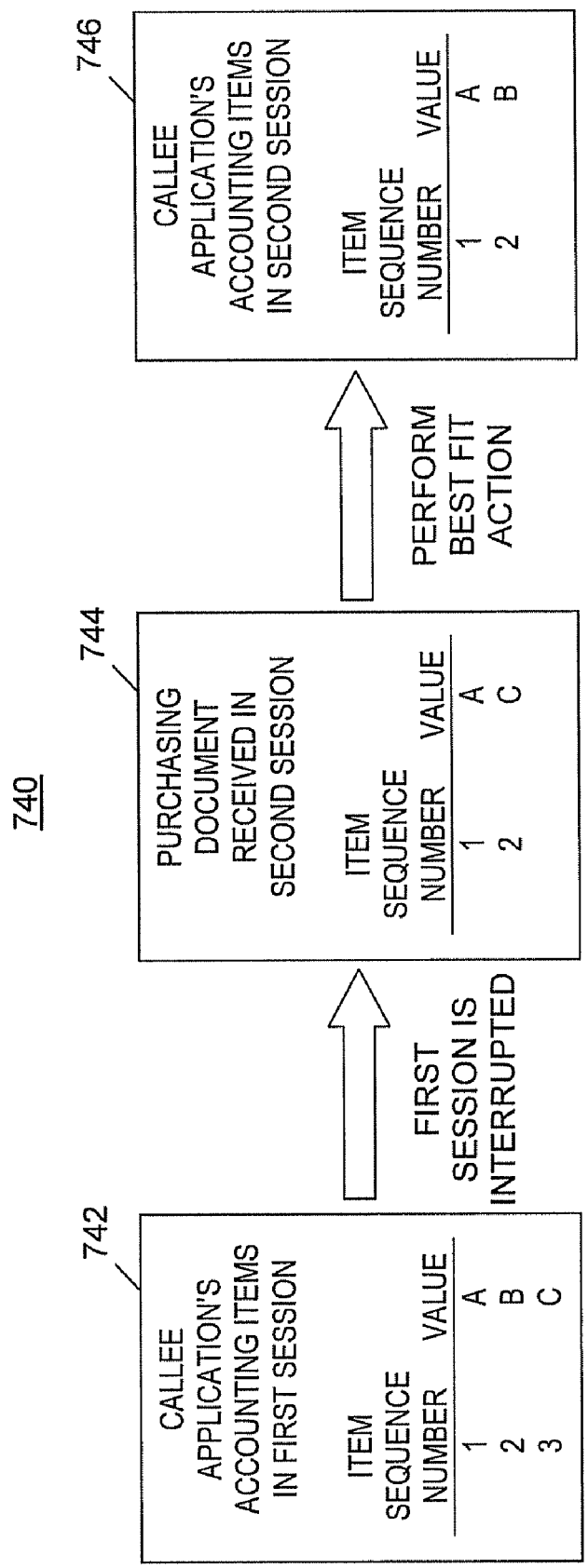
FIG. 7C depicts a third example of the rule-based recovery process of FIGS. 2A-2B performing the best fit action of FIG. 4, where an accounting item in a first session is deleted after the first session is interrupted, in accordance with embodiments of the present invention.

FIG. 7C depicts a third example of the rule-based recovery process of FIGS. 2A-2B performing the best fit action of FIG. 4, where an accounting item in a first session is deleted after the first session is interrupted, in accordance with embodiments of the present invention. Example 740 includes accounting items 742 that are processed by callee application 110 (see FIG. 1) in a first user session. Accounting items 742 include accounting items "A", "B" and "C" identified by item sequence numbers 1, 2 and 3, respectively. After the first session is interrupted unexpectedly, the callee application 110 (see FIG. 1) establishes a second session and a purchasing document 744 is received by the callee application in the second session. Purchasing document 744 is an example of document 112 (see FIG. 1) and is a result of an end user deleting accounting item "B" and retaining accounting items "A" and "C". In response to accounting item "B" being deleted, the item sequence number 2 in purchasing document 744 is associated with accounting item "C", which had previously been associated with item sequence number 3 in the first session.

In step 402 (see FIG. 4), the callee application 110 (see FIG. 1) applies a business rule included in configuration data 118 (see FIG. 1). The application of the business rule selects the best fit action from among the choices of a delete action, a best fit action and a merge action based on an identifier of calling application 108 (see FIG. 1) or other information included in purchasing document 744.

The callee application 110 (see FIG. 1) performs the best fit action in step 404 (see FIG. 4) which results in a set of accounting items 746. Performing the best fit action in example 740 copies the "A" accounting item having item sequence number 1 in the first session to the accounting item in the second session having the same item sequence number 1 (see accounting items 746). The callee application copies the "B" accounting item having item sequence number 2 in the first session to the accounting item in the second session having the same item sequence number 2. Furthermore, since purchasing document 744 includes no match for item sequence number 3 in accounting items 742, the callee application 110 (see FIG. 1) does not include accounting item "C" in the accounting items 746 in the second session.

As shown in example 740, the "best fit" to synchronize accounting items in the second session with accounting items in the first session is to set the second accounting item in the second session as the second accounting item "B" of the first session instead of the second accounting item "C" of the purchasing document 744.

Figure 8A:
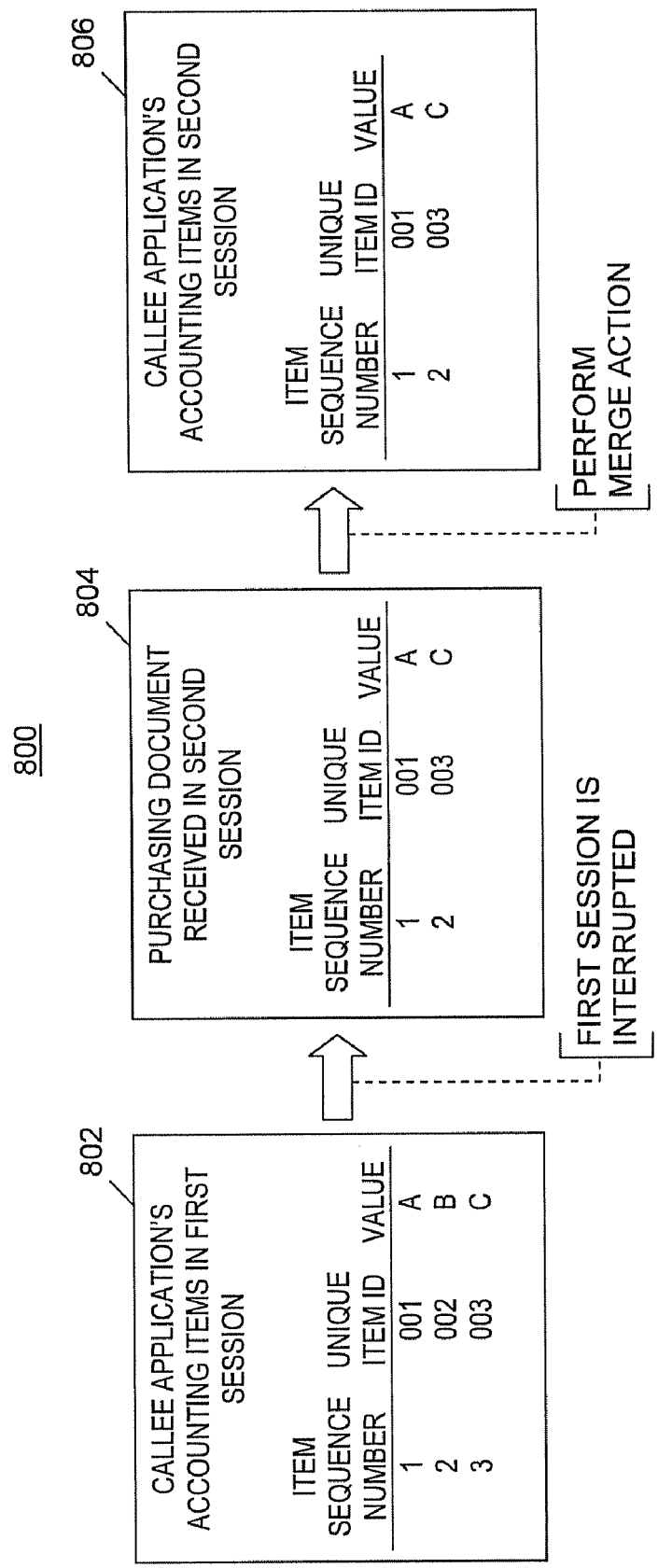
FIG. 8A depicts a first example of the rule-based recovery process of FIGS. 2A-2B performing the merge action of FIG. 5, where an accounting item in a first session is deleted after the first session in interrupted, in accordance with embodiments of the present invention.

FIG. 8A depicts a first example of the rule-based recovery process of FIGS. 2A-2B performing the merge action of FIG. 5, where an accounting item in a first session is deleted after the first session in interrupted, in accordance with embodiments of the present invention. Example 800 includes accounting items 802 that are processed by callee application 110 (see FIG. 1) in a first user session. Accounting items 802 include accounting items "A", "B" and "C" identified by item sequence numbers 1, 2 and 3, respectively, and by unique item IDs 001, 002, and 003, respectively. After the first session is interrupted unexpectedly, the callee application 110 (see FIG. 1) establishes a second session and a purchasing document 804 is received by the callee application in the second session. Purchasing document 804 is an example of document 112 (see FIG. 1) and is a result of an end user deleting accounting item "B" and retaining accounting items "A" and "C". In response to accounting item "B" being deleted, the item sequence number 2 in purchasing document 804 is associated with accounting item "C", which had previously been associated with item sequence number 3 in the first session. The unique item ID of accounting item "C", however, remains the same before and after the interruption. Thus, accounting item "C" has unique item ID 003 in accounting items 802 and has the same unique item ID (i.e., 003) in purchasing document 804.

In step 502 (see FIG. 5), the callee application 110 (see FIG. 1) applies a business rule included in configuration data 118 (see FIG. 1). The application of the business rule selects the merge action from among the choices of a delete action, a best fit action and a merge action based on an identifier of calling application 108 (see FIG. 1) or other information included in purchasing document 804.

The callee application 110 (see FIG. 1) performs the merge action in step 504 (see FIG. 5), which results in a set of accounting items 806. Performing the merge action in example 800 identifies the unique item IDs in accounting items 802 that match unique item IDs in purchasing document 804. That is, the callee application determines that unique item ID 001 in accounting items 802 equals unique item ID 001 in purchasing document 804 and that unique item ID 003 in accounting items 802 equals unique item ID 003 in purchasing document 804. The merge action copies the accounting items for the unique item IDs that match. Thus, in example 800, the "A" accounting item having unique item ID 001 in the first session is copied to the accounting item in the second session having the same unique item ID number 001 (see accounting items 806). Furthermore, the "C" accounting item having unique item ID 003 in the first session is copied to the accounting item in the second session having the same unique item ID number 003 (see accounting items 806). Moreover, since purchasing document 804 includes no match for unique item ID number 002 in accounting items 802, the callee application 110 (see FIG. 1) does not include accounting item "B" in the accounting items 806 in the second session.

As shown in example 800, the merge action synchronizes accounting items in the second session with accounting items in the first session by setting the accounting items 806 in the second session to the accounting items in purchasing document 804, for any accounting item in purchasing document 804 whose unique item ID matches a unique item ID in accounting items 802.

Figure 8B:
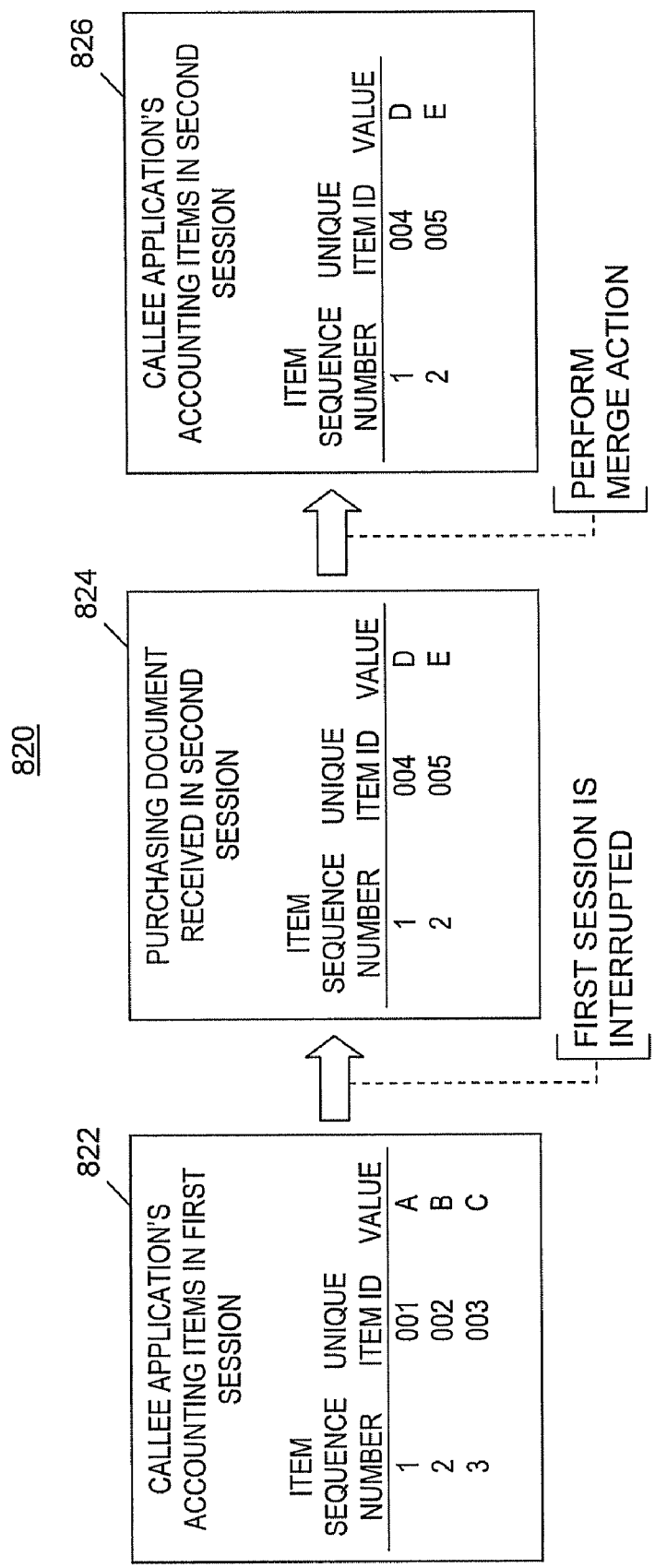
FIG. 8B depicts a second example of the rule-based recovery process of FIGS. 2A-2B performing the merge action of FIG. 5, where no item identifier of a first session matches an item identifier in a purchasing document received in a second session, in accordance with embodiments of the present invention.

FIG. 8B depicts a second example of the rule-based recovery process of FIGS. 2A-2B performing the merge action of FIG. 5, where no item identifier of a first session matches an item identifier in a purchasing document received in a second session, in accordance with embodiments of the present invention. Example 820 includes accounting items 822 that are processed by callee application 110 (see FIG. 1) in a first user session. Accounting items 822 include accounting items "A", "B" and "C" identified by item sequence numbers 1, 2 and 3, respectively, and by unique item IDs 001, 002, and 003, respectively. After the first session is interrupted unexpectedly, the callee application 110 (see FIG. 1) establishes a second session and a purchasing document 824 is received by the callee application in the second session. Purchasing document 824 is an example of document 112 (see FIG. 1) and is a result of an end user deleting accounting items "A", "B" and "C" and adding accounting items "D" and "E".

In step 502 (see FIG. 5), the callee application 110 (see FIG. 1) applies a business rule included in configuration data 118 (see FIG. 1). The application of the business rule selects the merge action from among the choices of a delete action, a best fit action and a merge action based on an identifier of calling application 108 (see FIG. 1) or other information included in purchasing document 804.

The callee application 110 (see FIG. 1) performs the merge action in step 504 (see FIG. 5), which results in a set of accounting items 826. Performing the merge action in example 820 includes the callee application determining that no unique item ID in accounting items 822 equals a unique item ID in purchasing document 824. As part of the merge action, the callee application also determines that there ate accounting items included in the document reopened in step 214 (see FIG. 2A) that are identified by unique item IDs that are not included in the first user session. Thus, in example 820, the callee application determines that accounting items "D" and "E" respectively have unique item IDs 004 and 005 in purchasing document 824 that are not included in the unique IDs (i.e., 001, 002, and 003) that identify accounting items 822 in the first user session. The merge action includes the callee application retaining any accounting item in the second session that has a unique item ID that is determined to be not included in the first user session. Thus, in example 820, the accounting item "D", which is determined to have a unique item ID (i.e., 004 in purchasing document 824) that is not included in the first user session (i.e., not included in 001, 002 and 003 of accounting items 822), is included in accounting items 826 (i.e., the callee application retains accounting item "D" in the second session). Similarly, the accounting item "E" having the unique item ID 005 that is determined to be not included in the first user session is included in accounting items 826 (i.e., the callee application retains accounting item "E" in the second session).

Furthermore, as part of the merge action, the callee application determines that there are accounting items in the first user session that are identified by unique item IDs that are not included in the document reopened in step 214 (see FIG. 2A). Thus, in example 820, the callee application determines that accounting items "A", "B" and "C" in accounting items 822 have unique item IDs 001, 002, and 003 that are not included in purchasing document 824. The merge action includes the callee application deleting any accounting item in the first user session that has a unique item ID that is not included in the document reopened in step 214 (see FIG. 2A). Thus, in example 820, the callee application deletes the accounting items "A", "B", and "C" from data store 116 (see FIG. 1), so that "A", "B" and "C" are not included in the second session.

As shown in example 820, the merge action synchronizes accounting items in the second session with accounting items in the first session by (1) retaining in the second session a first set of accounting items identified in document 824, where the unique item IDs identifying the first set of accounting items are not included in the first session, and (2) deleting a second set of accounting items included in the first session so that the second session does not include the second set of accounting items, where the unique item IDs identifying the second set of accounting items are not included in document 824.

It should be noted that FIG. 8B illustrates how the merge action provides a more precise result with new data as compared to the result of the best fit action described above. Since the merge action has knowledge of the unique item IDs and that unique item IDs 001, 002, and 003 do not exist in the new purchasing document (i.e., document 824), the merge action does not merge the old data associated with unique item IDs 001, 002, and 003, and instead includes new data identified by unique item IDs 004 and 005 (i.e., see accounting items 826, which include new accounting items "D" and "E" that are included in purchasing document 824, but not old accounting items "A" and "B" that are included in the first session). In contrast, the best fit action illustrated in FIG. 7B has no knowledge of unique item IDs. Based on the best fit action's knowledge of sequence numbers, old data identified by the sequence numbers 1 and 2 in the first session (see accounting items 722 in FIG. 7B) replaces the new data identified by sequence numbers 1 and 2 in purchasing document 724 (see FIG. 7B), so that the second session includes old data, but not the new data (see accounting items 726 in FIG. 7B, which include old accounting items "A" and "B" from the first session, but not the new accounting items "D" and "E" that are included in purchasing document 724 in FIG. 7B).

Computing System

Figure 9:
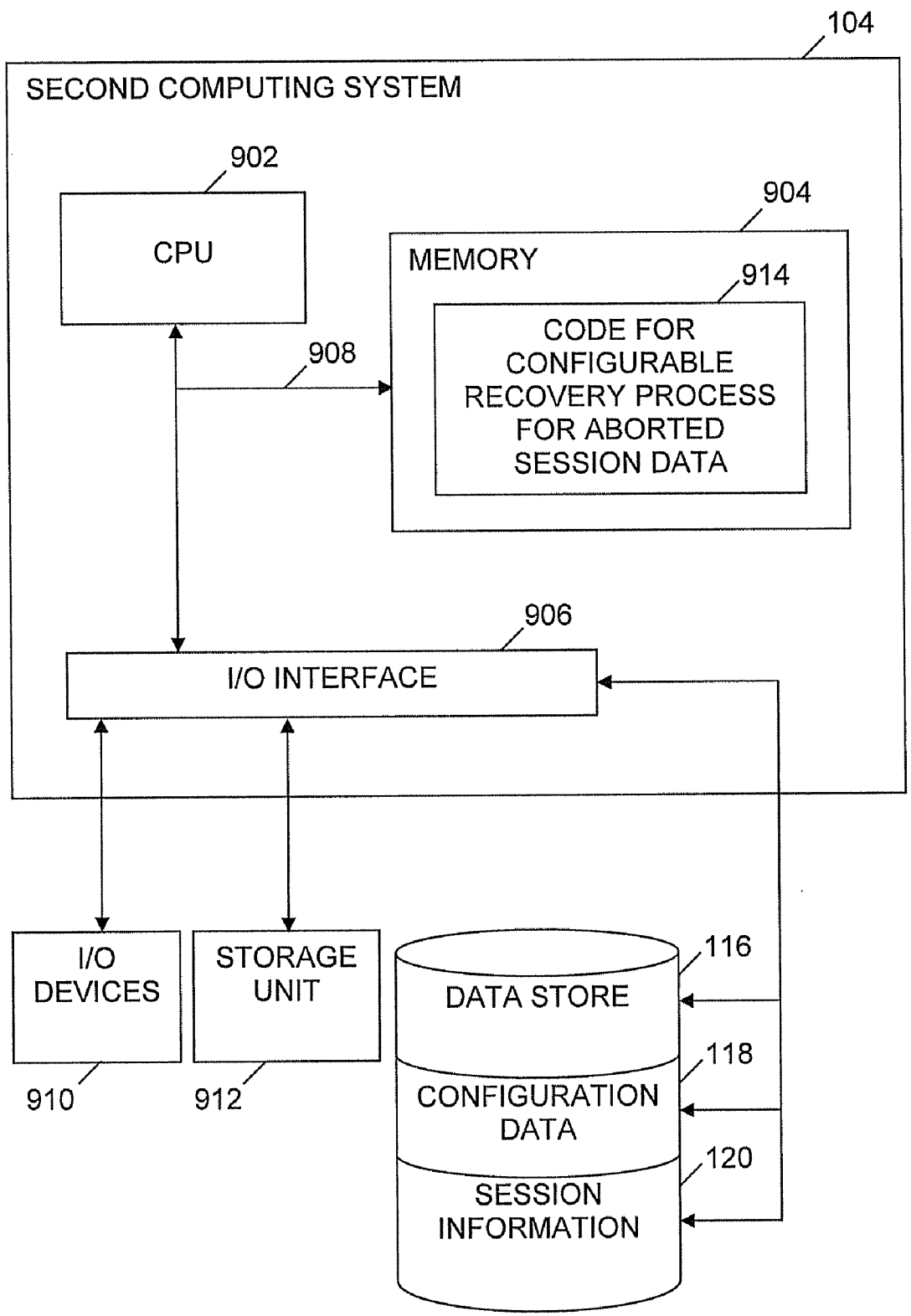
FIG. 9 is a block diagram of a computing system that is included in the system of FIG. 1 and that implements the process of FIGS. 2A-2B, in accordance with embodiments of the present invention.

FIG. 9 is a block diagram of a computing system that is included in the system of FIG. 1 and that implements the process of FIGS. 2A-2B, in accordance with embodiments of the present invention. Computing system 104 generally comprises a central processing unit (CPU) 902, a memory 904, an input/output (I/O) interface 906, and a bus 908. Further, computing system 104 is coupled to I/O devices 910 and a computer data storage unit 912. Storage unit 912 or one or more other computer data storage units (not shown) that are coupled to computing system 104 may store data store 116, configuration data 118 and session information 120. CPU 902 performs computation and control functions of computing system 104. CPU 902 may comprise a single processing unit, or be distributed across one or more processing units in one or more locations (e.g., on a client and server).

Memory 904 may comprise any known type of computer data storage and/or transmission media, including bulk storage, magnetic media, optical media, random access memory (RAM), read-only memory (ROM), a data cache, a data object, etc. In one embodiment, cache memory elements of memory 904 provide temporary storage of at least some program code (e.g., code 914) in order to reduce the number of times code must be retrieved from bulk storage during execution. Moreover, similar to CPU 902, memory 904 may reside at a single physical location, comprising one or more types of data storage, or be distributed across a plurality of physical systems in various forms. Further, memory 904 can include data distributed across, for example, a local area network (LAN) or a wide area network (WAN).

I/O interface 906 comprises any system for exchanging information to or from an external source. I/O devices 910 comprise any known type of external device, including a display device (e.g., monitor), keyboard, mouse, printer, speakers, handheld device, facsimile, etc. Bus 908 provides a communication linlk between each of the components in computing system 104, and may comprise any type of transmission link, including electrical, optical, wireless, etc.

I/O interface 906 also allows computing system 104 to store and retrieve information (e.g., data or program instructions such as code 914) from an auxiliary storage device such as computer data storage unit 912 or another computer data storage unit (not shown). Computer data storage unit 912 may be a non-volatile storage device, such as a magnetic disk drive (i.e., hard disk drive) or an optical disc drive (e.g., a CD-ROM drive which receives a CD-ROM disk).

Memory 904 includes computer program code 914 that provides the logic for a configurable recovery process for aborted session data (e.g., the process of FIGS. 2A-2B and FIGS. 3-5). In one embodiment, code 914 is included in callee application 110 (see FIG. 1; not shown in FIG. 9), which is included in memory 904. Further, memory 904 may include other systems not shown in FIG. 9, such as an operating system (e.g., Linux) that runs on CPU 902 and provides control of various components within and/or connected to computing system 104.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "system" (e.g., system 100 of FIG. 1 or computing system 104). Furthermore, the present invention may take the form of a computer program product embodied in any tangible medium of expression (e.g., memory 904 or computer data storage unit 912) having computer-usable program code (e.g., code 914) embodied or stored in the medium.

Any combination of one or more computer-usable or computer-readable medium(s) (e.g., memory 904 and computer data storage unit 912) may be utilized. The computer-usable or computer-readable medium may be, for example but not limited to, an electronic, magnetic, optical, electromagnetic, infrared or semiconductor system, apparatus, device or propagation medium. A non-exhaustive list of more specific examples of the computer-readable medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program 914 is printed, as the program 914 can be electronically captured via, for instance, optical scanning of the paper or other medium, then compiled, interpreted, or otherwise processed in a suitable manner, if necessary, and then stored in a computer memory 904. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code (e.g., code 914) for carrying out operations of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server (e.g., computing system 104). In the latter scenario, the remote computer may be connected to the user's computer through any type of network (not shown), including a LAN, a WAN, or the connection may be made to an external computer (e.g., through the Internet using an Internet Service Provider).

The present invention is described herein with reference to flowchart illustrations (e.g., FIGS. 2A-2B and FIGS. 3-5) and/or block diagrams of methods, apparatus (systems) (e.g., FIG. 1 and FIG. 9), and computer program products according to embodiments of the invention. It will be understood that each block of the flowchart illustrations and/or block diagrams, and combinations of blocks in the flowchart illustrations and/or block diagrams, can be implemented by computer program instructions (e.g., code 914). These computer program instructions may be provided to a processor (e.g., CPU 902) of a general purpose computer (e.g., computing system 104), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium (e.g., memory 904 or computer data storage unit 912) that can direct a computer (e.g., computing system 104) or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer (e.g., computing system 104) or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Any of the components of the present invention can be deployed, managed, serviced, etc. by a service provider that offers to deploy or integrate computing infrastructure with respect to the configurable recovery process for aborted session data. Thus, the present invention discloses a process for supporting computer infrastructure, comprising integrating, hosting, maintaining and deploying computer-readable code (e.g., code 914) into a computing system (e.g., computing system 104), wherein the code in combination with the computing system is capable of performing a configurable recovery process for aborted session data.

In another embodiment, the invention provides a business method that performs the process steps of the invention on a subscription, advertising and/or fee basis. That is, a service provider, such as a Solution Integrator, can offer to create, maintain, support, etc. a configurable recovery process for aborted session data. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIGS. 2A-2B and FIGS. 3-5 and the block diagrams in FIG. 1 and FIG. 9 illustrate the architecture, functionality, and operation of possible implementations of systems, methods, and computer program products according to various embodiments of the present invention. In this regard, each block in the flowchart or block diagrams may represent a module, segment, or portion of code (e.g., code 914), which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of recovering data from an aborted session via an application of a rule, said method comprising:

initiating a first session having a first identifier (first session ID) of said first session and a first document identifier (first document ID) of a first document provided by a calling application executed by a first computing system, wherein said initiating said first session is performed by a callee application executed by a second computing system, and wherein said first document has M data items identified by M data item identifiers in a one-to-one correspondence, said M data items having a first plurality of sequential positions within said first document that are identified by M sequence numbers in a one-to-one correspondence;

initiating a second session having a second session identifier (second session ID) of said second session and a second document identifier (second document ID) of a second document provided by said calling application, wherein said initiating said second session is performed by said callee application after said first session is interrupted without said callee application terminating said first session, and wherein said second document has N data items identified by N data item identifiers in a one-to-one correspondence, said N data items having a second plurality of sequential positions within said second document that are identified by N sequence numbers in a one-to-one correspondence;

determining that said first document ID is identical to said second document ID by said callee application subsequent to said initiating said second session;

applying a rule by said callee application and in response to said determining that said first document ID is identical to said second document ID, wherein said rule associates a recovery action of a plurality of predefined recovery actions with a data item of said first document, wherein said applying said rule includes detecting said data item of said first document and in response to said detecting, selecting said recovery action from said plurality of predefined recovery actions, and wherein said data item of said first document is an identification of said calling application that is a metadata item not included in said M data items or a value entered for a data item of said M data items by an end user of said calling application; and performing said recovery action by said callee application, wherein a result of said performing said recovery action is a display on a display device, wherein said display on said display device is selected from the group consisting of a display of at least one data item of said M data items, a display of at least one data item of said N data items, a display of an indication that no data item of said M data items or said N data items is being processed in said second session and combinations thereof and therebetween.

2. The method of claim 1, wherein said selecting said recovery action includes selecting a best fit action from said plurality of predefined recovery actions, and wherein said performing said recovery action includes recovering one or more data items from said M data items based on one or more sequence numbers of said M sequence numbers matching one or more sequence numbers of said N sequence numbers.

3. The method of claim 2, wherein said performing said recovery action further includes determining that M=N, wherein said recovering said one or more data items from said M data items includes copying said M data items to said N data items in response to said determining that M=N, and wherein said copying said M data items includes:

identifying a sequence number (first sequence number) of said M sequence numbers that equals a sequence number (second sequence number) of said N sequence numbers; and in response to said identifying that said first sequence number equals said second sequence number, copying a data item (first data item) of said M data items to a data item (second data item) of said N data items, wherein said first data item has a sequential position of said first plurality of sequential positions identified by said first sequence number, and wherein said second data item has a sequential position of said second plurality of sequential positions identified by said second sequence number.

4. The method of claim 2, wherein said performing said recovery action further includes determining that M<N, and wherein said recovering said one or more data items from said M data items includes:

identifying that said M sequence numbers match a first sequence number of said N sequence numbers through an M-th sequence number of said N sequence numbers in a one-to-one correspondence;

in response to said identifying that said M sequence numbers match said first sequence number through said M-th sequence number, copying said M data items to a first data item of said N data items through an M-th data item of said N data items, wherein said M data items have sequential positions of said first plurality of sequential positions identified by said M sequence numbers, and wherein said first data item through said M-th data item have sequential positions of said second plurality of sequential positions identified by said first sequence number through said M-th sequence number; and processing an (M+1)-th data item of said N data items through an N-th data item of said N data items in said second session as one or more new data items.

5. The method of claim 2, wherein said performing said recovery action further includes determining that M>N, and wherein said recovering said one or more data items from said M data items includes:

identifying that a first sequence number of said M sequence numbers through an N-th sequence number of said M sequence numbers match said N sequence numbers in a one-to-one correspondence;

in response to said identifying that said first sequence number through said N-th sequence number match said N sequence numbers, copying a first data item of said M data items through an N-th data item of said M data items to said N data items, wherein said first data item through said N-th data item have sequential positions of said first plurality of sequential positions identified by said first sequence number through said N-th sequence number, and wherein said N data items have sequential positions of said second plurality of sequential positions identified by said N sequence numbers; and in response to said identifying that said first sequence number through said N-th sequence number match said N sequence numbers, deleting an (N+1)-th data item of said M data items through an M-th data item of said M data items.

6. The method of claim 1, wherein said selecting said recovery action includes selecting a merge action from said plurality of predefined recovery actions, and wherein said performing said recovery action includes determining whether one or more data items from said M data items are recovered based on a result of a search for a first set of one or more data item identifiers of said M data item identifiers that matches a second set of one or more data item identifiers of said N data item identifiers.

7. The method of claim 6, wherein said determining whether said one or more data items from said M data items are recovered includes:

searching for said first set of one or more data item identifiers of said M data item identifiers that matches said second set of one or more data item identifiers of said N data item identifiers;

in response to said searching for said first set of one or more data item identifiers, identifying that said first set of one or more data item identifiers of said M data item identifiers matches said second set of one or more data item identifiers of said N data item identifiers;

in response to said identifying that said first set of one or more data item identifiers matches said second set of one or more data item identifiers, copying a first set of one or more data items of said M data items to a second set of one or more data items of said N data items, wherein said first set of one or more data items is identified by said first set of one or more data item identifiers and said second set of one or more data items is identified by said second set of one or more data item identifiers; and in response to said identifying that said first set of one or more data item identifiers matches said second set of one or more data item identifiers, deleting any other data item of said M data items that is not included in said first set of one or more data items.

8. The method of claim 6, wherein said determining whether said one or more data items from said M data items are recovered includes:

searching for said first set of one or more data item identifiers of said M data item identifiers that matches said second set of one or more data item identifiers of said N data item identifiers;

determining, in response to said searching, that no data item identifier of said M data item identifiers matches a data item identifier of said N data item identifier;

deleting said M data items, wherein a result of said deleting said M data items is a recovery of no data item from said M data items; and retaining said N data items in a data store.

9. The method of claim 1, wherein said selecting said recovery action includes selecting a delete action from said plurality of predefined recovery actions, and wherein said performing said recovery action includes replacing said M data items with said N data items irrespective of said M sequence numbers, said M data item identifiers, said N sequence numbers and said N data item identifiers.

10. The method of claim 1, further comprising said callee application determining that said first session is open subsequent to said initiating said second session.

11. The method of claim 1, further comprising said callee application deleting said first session subsequent to said performing said recovery action.

12. A computing system comprising a processor coupled to a computer-readable memory unit, said memory unit comprising a software application, said software application comprising instructions that when executed by said processor implement the method of claim 1.

13. A computer program product, comprising a computer-readable, tangible storage device having a computer-readable program code stored therein, said computer-readable program code containing instructions configured to be executed by a processor of a second computing system to implement a method of recovering data from an aborted session via an application of a rule, said method comprising:

initiating a first session having a first identifier (first session ID) of said first session and a first document identifier (first document ID) of a first document provided by a calling application executed by a first computing system, wherein said initiating said first session is performed by a callee application executed by said second computing system, and wherein said first document has M data items identified by M data item identifiers in a one-to-one correspondence, said M data items having a first plurality of sequential positions within said first document that are identified by M sequence numbers in a one-to-one correspondence;

initiating a second session having a second session identifier (second session ID) of said second session and a second document identifier (second document ID) of a second document provided by said calling application, wherein said initiating said second session is performed by said callee application after said first session is interrupted without said callee application terminating said first session, and wherein said second document has N data items identified by N data item identifiers in a one-to-one correspondence, said N data items having a second plurality of sequential positions within said second document that are identified by N sequence numbers in a one-to-one correspondence;

determining that said first document ID is identical to said second document ID by said callee application subsequent to said initiating said second session;

applying a rule by said callee application and in response to said determining that said first document ID is identical to said second document ID, wherein said rule associates a recovery action of a plurality of predefined recovery actions with a data item of said first document, wherein said applying said rule includes detecting said data item of said first document and in response to said detecting, selecting said recovery action from said plurality of predefined recovery actions, and wherein said data item of said first document is an identification of said calling application that is a metadata item not included in said M data items or a value entered for a data item of said M data items by an end user of said calling application; and performing said recovery action by said callee application, wherein a result of said performing said recovery action is a display on a display device, wherein said display on said display device is selected from the group consisting of a display of at least one data item of said M data items, a display of at least one data item of said N data items, a display of an indication that no data item of said M data items or said N data items is being processed in said second session and combinations thereof and therebetween.

14. The program product of claim 13, wherein said selecting said recovery action includes selecting a best fit action from said plurality of predefined recovery actions, and wherein said performing said recovery action includes recovering one or more data items from said M data items based on one or more sequence numbers of said M sequence numbers matching one or more sequence numbers of said N sequence numbers.

15. The program product of claim 13, wherein said selecting said recovery action includes selecting a merge action from said plurality of predefined recovery actions, and wherein said performing said recovery action includes determining whether one or more data items from said M data items are recovered based on a result of a search for a first set of one or more data item identifiers of said M data item identifiers that matches a second set of one or more data item identifiers of said N data item identifiers.

16. The program product of claim 13, wherein said selecting said recovery action includes selecting a delete action from said plurality of predefined recovery actions, and wherein said performing said recovery action includes replacing said M data items with said N data items irrespective of said M sequence numbers, said M data item identifiers, said N sequence numbers and said N data item identifiers.

17. A process for supporting computing infrastructure, said process comprising providing at least one support service for at least one of creating, integrating, hosting, maintaining, and deploying computer-readable code in a second computing system, wherein the code in combination with the second computing system is capable of performing a method of recovering data from an aborted session via an application of a rule, said method comprising:

initiating a first session having a first identifier (first session ID) of said first session and a first document identifier (first document ID) of a first document provided by a calling application executed by a first computing system, wherein said initiating said first session is performed by a callee application executed by said second computing system, and wherein said first document has M data items identified by M data item identifiers in a one-to-one correspondence, said M data items having a first plurality of sequential positions within said first document that are identified by M sequence numbers in a one-to-one correspondence;

initiating a second session having a second session identifier (second session ID) of said second session and a second document identifier (second document ID) of a second document provided by said calling application, wherein said initiating said second session is performed by said callee application after said first session is interrupted without said callee application terminating said first session, and wherein said second document has N data items identified by N data item identifiers in a one-to-one correspondence, said N data items having a second plurality of sequential positions within said second document that are identified by N sequence numbers in a one-to-one correspondence;

determining that said first document ID is identical to said second document ID by said callee application subsequent to said initiating said second session;

applying a rule by said callee application and in response to said determining that said first document ID is identical to said second document ID, wherein said rule associates a recovery action of a plurality of predefined recovery actions with a data item of said first document, wherein said applying said rule includes detecting said data item of said first document and in response to said detecting, selecting said recovery action from said plurality of predefined recovery actions, and wherein said data item of said first document is an identification of said calling application that is a metadata item not included in said M data items or a value entered for a data item of said M data items by an end user of said calling application; and performing said recovery action by said callee application, wherein a result of said performing said recovery action is a display on a display device, wherein said display on said display device is selected from the group consisting of a display of at least one data item of said M data items, a display of at least one data item of said N data items, a display of an indication that no data item of said M data items or said N data items is being processed in said second session and combinations thereof and therebetween.

18. The process of claim 17, wherein said selecting said recovery action includes selecting a best fit action from said plurality of predefined recovery actions, and wherein said performing said recovery action includes recovering one or more data items from said M data items based on one or more sequence numbers of said M sequence numbers matching one or more sequence numbers of said N sequence numbers.

19. The process of claim 17, wherein said selecting said recovery action includes selecting a merge action from said plurality of predefined recovery actions, and wherein said performing said recovery action includes determining whether one or more data items from said M data items are recovered based on a result of a search for a first set of one or more data item identifiers of said M data item identifiers that matches a second set of one or more data item identifiers of said N data item identifiers.

20. The process of claim 17, wherein said selecting said recovery action includes selecting a delete action from said plurality of predefined recovery actions, and wherein said performing said recovery action includes replacing said M data items with said N data items irrespective of said M sequence numbers, said M data item identifiers, said N sequence numbers and said N data item identifiers.

* * * * *